United States Patent [19]

Groeneveld et al.

[11] Patent Number: 4,535,551
[45] Date of Patent: Aug. 20, 1985

[54] TRANSFER APPARATUS

[75] Inventors: Michiel J. Groeneveld, Oldenzaal;
Albert B. Verver, Huissen;
Willibrordus P. M. Van Swaaij,
Losser, all of Netherlands

[73] Assignee: James Howden & Company,
Glasgow, Scotland

[21] Appl. No.: 589,635

[22] Filed: Mar. 14, 1984

[30] Foreign Application Priority Data

Sep. 15, 1982 [NL] Netherlands ............ 8203577

[51] Int. Cl.³ ............................................ F26B 17/14
[52] U.S. Cl. ........................................ 34/170; 34/178
[58] Field of Search ............... 34/167, 170, 178; 432/95, 96

[56] References Cited

U.S. PATENT DOCUMENTS 1,892,319 12/1932 Roth ................................. 34/170
2,536,099  1/1951 Schleicher .
3,721,017  3/1973 Niems ............................... 34/167
4,371,335  2/1983 Jones .

FOREIGN PATENT DOCUMENTS 8203577  9/1982 Netherlands .
2116869 10/1983 United Kingdom .

OTHER PUBLICATIONS

Kirk–Othmer Encyclopedia of Chemical Technology, vol. 22, pp. 276–282.

Primary Examiner—Larry I. Schwartz
Attorney, Agent, or Firm—Barnes & Thornburg

[57] ABSTRACT

Transfer apparatus comprising a vessel having an inlet and an outlet for particulate solid material and a inlet and outlet for fluid to flow in countercurrent or cocurrent to the solid material, and a packing within the vessel, the packing including a plurality of layers of bars (60 to 68) extending generally horizontally across the vessel, the bars of each layer being substantially parallel to one another and having a spacing between adjacent bars which is substantially the same for the bars of said layer. The parallel bars of each layer extend transversely, preferably perpendicular, to the parallel bars of the adjacent layer of layers.

13 Claims, 4 Drawing Figures

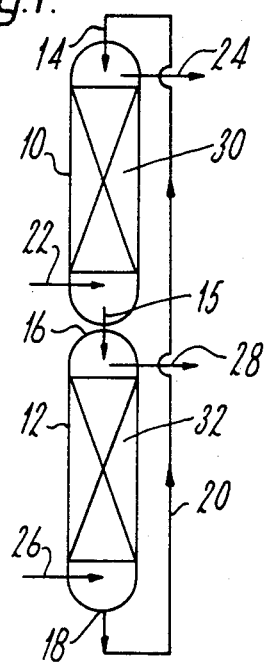
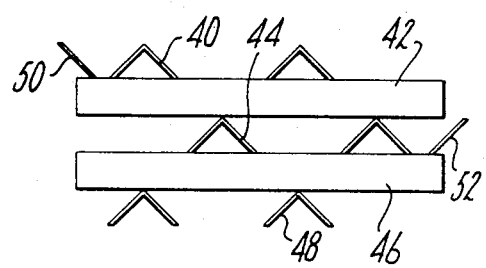
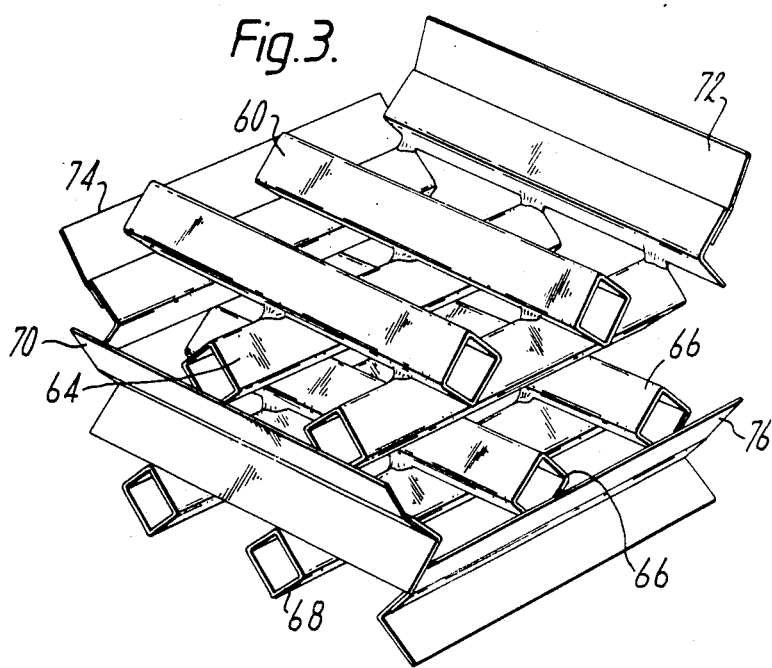

TRANSFER APPARATUS

The present invention relates to transfer apparatus which is suitable for heat and/or mass transfer.

Various forms of heat and/or mass transfer apparatus have been proposed. Most heat transfer apparatuses include a series of plates, tubes or the like, one fluid flowing on one side of the plate or pipe and another on the other. Such apparatus is generally satisfactory but it is not entirely efficient and it is not very suitable for use in mass transfer.

It has been proposed to provide a vessel having an inlet and a outlet for particulate solid material, an inlet and an outlet for fluid which flows in countercurrent or cocurrent through the vessel and a packing within the vessel. The solid material is used as a heat transfer medium and can also be used in mass transfer for example as a catalyst.

Such apparatus while having some advantages over the plate or pipe type has not proved entirely satisfactory because of channelling within the vessel.

It is now proposed, according to the present invention, for the packing to comprise a plurality of layers of bars extending generally horizontally across the vessel, the bars of each layer being substantially parallel to one another and having a spacing between adjacent bars which is substantially the same for the bars of that layer, the parallel bars of each layer extending transversely at an angle to the parallel bars of the adjacent layer or layers.

It has been found that such a packing arrangement ensures a very even distribution of fluid and the particulate material giving a good pattern of flow for effective transfer.

The spacing between the bars of a layer is preferably within the range 0.75 to 1.5 times the width of the bars so that the space available between the bars is approximately the same as the blocking effect of the bars.

Similarly the ratio of the height to width of each bar is preferably in the range of 0.5 to 2 and is advantageously of the order of 1.

The rods of each layer are advantageously arranged substantially perpendicular to the rods of the adjacent layer or layers above or below. The bars of one layer may then be placed parallel to the bars of the layer two above or two below. The bars of the layer two below or two above can then have a lateral shift with respect to those of the one layer and thereby particulate material falling between the bars of the said one layer will inevitably hit the bars of the layer below particularly if the shift is by an amount in the range of 0.35 to 0.8 times the width of the bars and preferably half the width.

The rods preferably have an upper surface which is inclined at an angle which is more than the angle of repose of the particulate material. This can be achieved by having the upper surface as an inverted V section, for example the rod being of a square cross-section with one corner of the square uppermost. Alternatively the rods can be circular, or elliptical, although this is less likely to provide the desired effect because of the possibility of the particulate material stacking on top of the bars.

When the apparatus is to be used in a very high temperature process, the bars are preferably of ceramic material and an arched ceramic support structure may be located below the lowermost of the layers of rods, the rods of said lowermost layers resting on and being supported by the structure. The rods of each layer thereabove will rest on and be supported by the rods of the layer immediately below them. Advantageously below the support structure there is provided a plurality of laterally spaced Y cross-section separator member which can have a hollow interior for the downflow of solid material. Thus the solid can be separated from the gas which can flow upwardly between the separator members. At least one of the separator members may be arranged higher than the others adjacent thereto, so that the arms of the various separator members overlap and together cover the whole area of the chamber, so that all the solid material falling will be picked up by the arms.

In order that the present invention may more readily be understood, the following description is given, merely by way of example, reference being made to the accompanying drawings in which:

FIG. 1 is a schematic diagram of one embodiment of apparatus according to the present invention;

FIG. 2 is a cross-section illustrating one particular form of bar arrangement;

FIG. 3 is a perspective view illustrating a second form of bar arrangement; and

Figure 4:
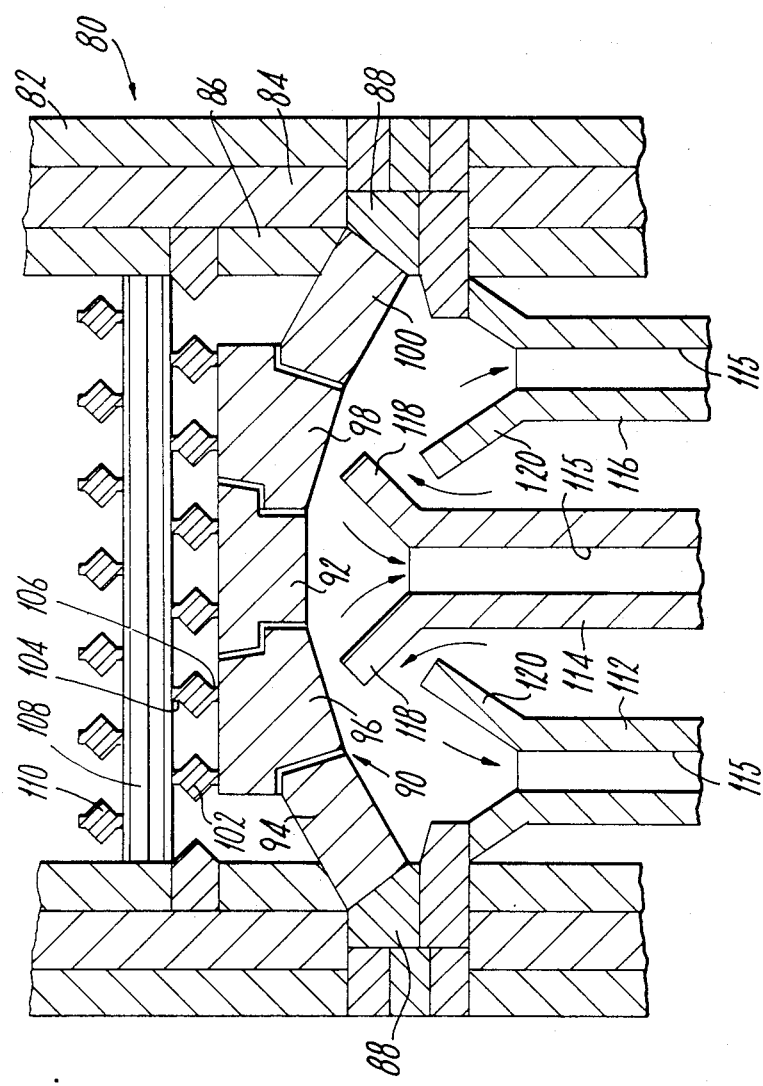
FIG. 4 is a cross-section through the lower part of a further form of an apparatus according to the invention.

Referring first to FIG. 1 there is illustrated therein an apparatus comprising first and second vessels 10, 12, the first vessel having a particulate solid, e.g. sand, inlet 14 and a solid outlet 15. This outlet 15 is connected to an inlet 16 of the second vessel 12 which, in turn, has a solid outlet 18. Solid material from the second vessel can be fed via a conveyor, illustrated schematically at 20, back to the inlet 14 of the first vessel 10.

Vessel 10 is provided with a hot gas inlet 22 and a cold gas outlet 24, while the second vessel is provided with a lower cold air inlet 26 and a hot air outlet 28.

Each vessel is provided with a packing intermediate the solid inlet and outlet the packing of vessel 10 being indicated by the reference 30 an that of the vessel 12 by the reference 32.

In use, particulate material, such as sand, is allowed to fall downwardly through the first vessel having entered inlet 14 and it is distributed within the vessel to be caused to flow in a uniform manner across the full cross-sectional width of the vessel 10 by the packing 30. It is caused to react thermally with the hot gas entering at 22. As the sand is cold, a heat exchange is produced so that the sand is heated and the hot gas is cooled. By the time it reaches the top of the vessel 10 the gas is relatively cold and is discharged as a cold gas at 24.

In order to recover the heat from the sand, the vessel 12 is used in a similar, but reverse, way. Cold air is caused to enter at 26 and the hot sand at 16. The packing 32 has a similar effect to the packing 30 and heat exchange takes place between the air and sand so that the sand is cooled and the air is heated being discharged at 28. The cold sand is then transferred by conveyor 20 to the inlet 14 so that the process can be carried out substantially continuously.

Such a system could be used, for example, to obtain a cooling of the exhaust gases of any suitable process, such as a glass or like oven and the recovered heat can be used to heat up the incoming air of combustion for the oven.

A very high efficiency of heat exchange can be achieved because of the even distribution of the sand, and there is little or no scaling.

The apparatus can be used for many different purposes and is not only involved as a heat exchange apparatus, but can also be used in a chemical exchange. For example, it is contemplated that the apparatus could be used to remove sulphur in chemical systems with the reaction of $H_2S$ and $SO_2$ to give sulphur and water, so that the sulphur can be removed. This can be applied, for example, in the Claus tail gases where $H_2S$ and $SO_2$ exist and on gas streams containing either $H_2S$ or $SO_2$, where necessary feeding one of these gases where only the other is present.

The apparatus can be used for heat transfer as indicated above, for mass transfer, without a chemical reaction, e.g. for gas cleaning with a solid which is an absorbant. It can be used in mass transfer with the solid being a catalyst.

Equilibrium can be shifted by removing a component of the solid e.g. in sulphur removal mentioned above.

In order that the flow of solid and gas is satisfactory to achieve these results, according to the present invention, the packing is in the form of a plurality of layers of bars extending generally horizontally of the vessel, the bars of each layer being substantially parallel to one another and having a spacing between adjacent bars which is substantially the same for the bars of that layer, the parallel bars of each layer extending transversely at an angle to the parallel bars of the adjacent layer or layers.

FIG. 2 illustrated such a construction in which the bars are indicated as being an inverted V cross-sections bars 40, 42, 44, 46. The bars 40 extend parallel to one another and have a constant spacing therebetween and the bars 42 extend transversely thereto, for example at right angles thereto.

The third layer of bars 44 extends transversely to the bars 42 and preferably perpendicular thereto so that they are parallel to the bars 40 and are preferably arranged so that they are between the bars 40. Again the bars 46 are transverse to the bars 44 and preferably parallel to the bars 42 and again are disposed offset from the bars 42. The apparatus in FIG. 2 also illustrates bars 48 which are placed substantially below the bars 40. At the edge of the apparatus there are indicated deflector bars 50, 52.

FIG. 3 illustrates a packing construction which is generally similar, but the bars 60, 64, 66, 68 are of generally square cross-section with one corner of each square uppermost so that the bars are arranged rather in the manner of a diamond. Once again the bars of the third layer (bars 66), are offset from, and indeed between, the bars 60 and bars 68 are offset from and between the bars 64. It will be appreciated that such an array of bars provides a very even distribution of downflowing particulate material, such as sand, catalyst, absorbent or the like so that the particulate material is evenly distributed across the full cross-section of the vessel (not shown in FIG. 3). This ensures a very good heat and/or mass transfer between the solid particulate material and the upflowing gas.

Referring now to FIG. 4 a further construction is illustrated showing how the bars, similar to those of FIG. 3, can be supported. The construction of FIG. 4 is intended for use in a high temperature environment and most of the parts illustrated are formed of a ceramic refractory material.

The vessel 80 includes an outer wall 82 and two inner liners 84, 86. Support bars 88 extend along each side of the vessel and serve to support an arched construction indicated generally by the reference 90. This includes a key stone 92 and suitable arch bricks 94, 96, 98, 100 and carried on the ring 88. The upper surfaces of the key stone 92 and of the bricks 96, 98 extend in a horizontal plane and mounted on a thus formed flat upper surface are a layer of generally diamond shaped bars 102, formed of a ceramic material, for example, and provided with upper and lower flat corner parts 104, 106. These serve to maintain the bars in the configuration illustrated. Mounted on the layer of bars 102 is a transversely extending layer of bars 108 only one of which, of course, can be seen in the drawing, these bars are generally similar to the bars of layer 102. A third layer 110 of again similar bars is provided, these again, as in FIG. 3, being offset laterally so as to lie approximately between the bars of the layer 102. There will be further bars stacked on top of one another alternately one way, and the other. The thus formed packing again provides a very even distribution without any fear of channelling by either the solid or the gas and therefore gives a high measure of heat and/or mass transfer.

Positioned below the arch 90 are three separator members 112, 114, 116. It will be seen that each of these is of generally Y cross-section having a hollow interior 115 for the downflow of solid material. The central separator member 114 is higher than the separator members 112, 116 adjacent thereto, and the arms 118 of the central member 114 overlap the arms 120 of the members 112, 116, so that solid material falling downwardly in all parts of the cross-section of the chamber within the vessel 80 fall into one of the separator members, which collectively span the whole of the cross-section. Solid material flowing through the hollow interior 115 can be discharged and collected as explained with reference to FIG. 1. Upflowing gas passes between the arms of the separator member 112, 116 and the arms 118 of the central separator member 114. This arrangement therefore separates the gas from the solid in a satisfactory manner.

Because it is sometimes desirable to have the bars formed of ceramic material if very high temperatures are encountered the arch structure of FIG. 4 is particularly useful in providing adequate support for such ceramic members which are not capable of withstanding any level of tension.

It will be appreciated that the apparatus of the present invention in all the embodiments illustrated is particularly efficient having no dead zones so that a good degree of heat and/or mass transfer can be achieved.

The apparatus has been described as having the bars of one layer resting directly on those of the layer below. In fact the bars of one layer can be mounted with a spacing compared to those of the layer above and/or below. This spacing is preferably no more than 10 times the vertical height of the bars.

We claim:

1. Transfer apparatus comprising, in combination:
   a. a vessel defining a vertically extending contact chamber having upper and lower parts;
   b. a solids inlet in the upper part of said vessel for solid particulate material;
   c. a solids oulet in the lower part of said vessel for solid particulate material;
   d. a fluid inlet in the lower part of said vessel;
   e. A fluid outlet in the upper part of said vessel;
   f. A plurality of layers of bars extending generally horizontally across said vessel, at a level below the solids inlet and fluid outlet and above the solids outlet and fluid inlet, the bars of each layer being substantially parallel to one another and having a spacing between adjacent bars which is substantially the same for the bars of that layer, the parallel bars of each layer extending transversely, at an angle to the parallel bars of the adjacent layer or layers, said bars being effective to give an even distribution of solid particulate material over the cross-section of the contact chamber as it flows downwardly in said contact chamber and an even distribution of fluid over the cross-section of the contact chamber as it flows upwardly in said contact chamber.

2. Apparatus as claimed in claim 1, wherein the spacing between the bars of a layer is in the range 0.75 to 1.5 times the width of the bars of that layer.

3. Apparatus as claimed in claim 1, wherein the ratio of the height/width of each bar is in the range 0.5 to 2.0.

4. Apparatus as claimed in claim 1, wherein the rods of each layer are arranged substantially perpendicular to the rods of the adjacent layer or layers above and/or below.

5. Apparatus as claimed in claim 1, wherein the bars of one layer are parallel to the bars of the layer two above or two below, the bars of said layer two above or two below having a laterally shift with respect of those of said one layer.

6. Apparatus as claimed in claim 5, wherein said lateral shift is by an amount in the range 0.35–0.8 times the width of the bars.

7. Apparatus as claimed in claim 1, wherein the rods have an upper surface which is of inverted V cross-section.

8. Apparatus as claimed in claim 7, wherein the rods are of square cross-section, with one corner of the square uppermost.

9. Apparatus as claimed in claim 1, wherein the rods are formed of a ceramic material.

10. Apparatus as claimed in claim 1, and further comprising means to support said bars in said vessel, said support means comprising an arched ceramic support structure located below the lowermost of said layers of rods, the rods of said lowermost layer resting on and being supported by said structure, the rods of each layer thereabove resting on and being supported by the rods of the layer immediately therebelow.

11. Apparatus as claimed in claim 10 wherein said solids outlet and said solid fluid inlet include, below said support structure, a plurality of laterally spaced Y cross-section separator members having a hollow interior for the downflow of solid material, whereby the solid is separated from the fluid which can flow upwardly between said separator members.

12. Apparatus as claimed in claim 11, wherein at least one of said separator members is arranged higher than the separator member or members adjacent thereto, whereby the arms of said at least one separator member overlap those of said adjacent separator member or members, effective to enable solid material falling in all parts of the cross-section of the chamber to fall into one of said separator members.

13. Apparatus as claimed in claim 1, wherein the vertical spacing between the layers of bars is no more than 10 times the vertical height of the bars.

* * * * *